United States Patent
Suliman et al.

(10) Patent No.: US 8,219,031 B2
(45) Date of Patent: Jul. 10, 2012

(54) MONITORING CHANNELS

(75) Inventors: Isameldin Mohammed Suliman, Oulu (FI); Pasi Maliniemi, Varjakka (FI); Johanna Vartiainen, Haukipudas (FI); Timo Hongell, Oulu (FI); Ari Tenhunen, Oulu (FI)

(73) Assignee: Elektrobit Wireless Communications Oy, Oulu (FI)

( * ) Notice: Subject to any disclaimer, the term of this patent is extended or adjusted under 35 U.S.C. 154(b) by 65 days.

(21) Appl. No.: 12/988,337

(22) PCT Filed: Apr. 23, 2008

(86) PCT No.: PCT/FI2008/050215
§ 371 (c)(1),
(2), (4) Date: Dec. 1, 2010

(87) PCT Pub. No.: WO2009/130361
PCT Pub. Date: Oct. 29, 2009

(65) Prior Publication Data
US 2011/0159827 A1  Jun. 30, 2011

(51) Int. Cl.
*H04B 15/00* (2006.01)
*H04K 3/00* (2006.01)

(52) U.S. Cl. .................. 455/62; 455/67.11; 455/450

(58) Field of Classification Search .......... 455/62, 455/67.11, 450–455
See application file for complete search history.

(56) References Cited

U.S. PATENT DOCUMENTS

| 5,280,630 A * | 1/1994 | Wang ............. 455/452.2 |
| 2004/0242149 A1 | 12/2004 | Luneau |
| 2005/0026610 A1 | 2/2005 | Backes et al. |
| 2005/0226269 A1 | 10/2005 | Seo et al. |
| 2008/0013517 A1 | 1/2008 | Buchwald et al. |

FOREIGN PATENT DOCUMENTS

| EP | 1096730 A1 | 5/2001 |
| WO | WO9219982 A1 | 11/1992 |

OTHER PUBLICATIONS

Ville Mottonen, International Search Report for corresponding International Application No. PCT/FI2008/050215, Jan. 21, 2009, pp. 1-6.

* cited by examiner

*Primary Examiner* — Lee Nguyen
(74) *Attorney, Agent, or Firm* — Hoffmann & Baron, LLP

(57) ABSTRACT

A transmitter of a cognitive radio comprises a selector for selecting from a memory a channel which is determined free, for a power measurement. A power meter measures the received power from the selected channel. Detection selector compares the measured power and a power of the same channel saved in the memory and selects the channel for detection if the power in the channel is within a predetermined range from the power saved in the memory. A detector performs detection of the channel as a response to the selection for detection. A channel selector selects the channel for communication if the channel is detected unoccupied on the basis of detection. The transmitter communicates in the channel as a response to the selection for communication.

17 Claims, 3 Drawing Sheets

MONITORING CHANNELS

CROSS-REFERENCE TO RELATED APPLICATION

This application is a National Phase application of International Application No. PCT/FI2008/050215, filed on Apr. 23, 2008, which is incorporated herein by reference.

BACKGROUND

1. Field

The invention relates to monitoring channels in a radio system, particularly in a cognitive radio system.

2. Description of the Related Art

Bands at the radio frequencies of the electromagnetic continuum have already long been too crowded and the distribution of users has not been even in the bands, which has resulted in a poor service. A wireless technology of SDR (Software-Defined Radio) is an attempt to relieve the problems.

Cognitive radio belongs to an SDR platform where a radio automatically searches for an unused channel for its transmission. The transmitter has an adaptive software which does the searching and enables the radio to reconfigure its communication parameters when an unused channel is found. Using the software, the radio starts its operation by performing an LBT (Listen Before Transmission) scheme for a free channel. The radio may also jump from a channel, whose quality of service may be deteriorating, to a new channel lightning fast without causing an interruption in its transmission.

However, searching for an available channel has proved a difficult problem. The problem is particularly complicated when a radio has a large number of channels to sift through and among them (only) a few channels may be free. The searching takes a long time and the result is not reliable but ends up in a channel which is actually in use already. Hence, there is a need for a fast and reliable search process.

SUMMARY

An object of the invention is to provide an improved monitoring solution. According to an aspect of the invention, there is provided communication method of a cognitive radio. The method further comprises selecting, from a memory including information on a plurality of channels, a channel which is determined free, for power measurement; measuring the received power from the selected channel; comparing the measured power and a power of the same channel saved in the memory; selecting the channel for detection if the power in the channel is within a predetermined range from the power saved in the memory; performing detection of the channel as a response to the selection for detection; selecting the channel for communication if the channel is detected unoccupied on the basis of detection; and communicating in the channel as a response to the selection for communication.

According to another aspect of the invention, there is provided a transmitter of a cognitive radio. The transmitter comprises a power meter, a power selector, a detector, a detection selector, a memory and a channel selector; the power selector being configured to select from a memory including information on a plurality of channels, a channel which is determined free, for a power measurement; the power meter being configured to measure the received power from the selected channel; detection selector being configured to compare the measured power and a power of the same channel saved in the memory and to select the channel for detection if the power in the channel is within a predetermined range from the power saved in the memory; the detector being configured to perform detection of the channel as a response to the selection for detection; the channel selector being configured to select the channel for communication if the channel is detected unoccupied on the basis of detection; and the transmitter being configured to communicate in the channel as a response to the selection for communication.

According to another aspect of the invention, there is provided a computer program product encoding a computer program of instructions for executing a computer process for communication method of a cognitive radio. The computer process comprises selecting, from a memory including information on a plurality of channels, a channel, which is determined free, for a power measurement; measuring the received power from the selected channel; comparing the measured power and a power of the same channel saved in the memory; selecting the channel for detection if the power in the channel is within a predetermined range from the power saved in the memory; performing detection of the channel as a response to the selection for detection; selecting the channel for communication if the channel is detected unoccupied on the basis of detection; and performing communication in the channel as a response to the selection for communication.

According to another aspect of the invention, there is provided a computer program distribution medium readable by a computer and encoding a computer program of instructions for executing a computer process for communication method of a cognitive radio. The computer process comprises selecting, from a memory including information on a plurality of channels, a channel, which is determined free, for a power measurement; measuring the received power from the selected channel; comparing the measured power and a power of the same channel saved in the memory; selecting the channel for detection if the power in the channel is within a predetermined range from the power saved in the memory; performing detection of the channel as a response to the selection for detection; selecting the channel for communication if the channel is detected unoccupied on the basis of detection; and performing communication in the channel as a response to the selection for communication.

The invention provides several advantages. The search process for an available channel becomes fast and reliable. This makes adaptation to the environment quick and increases spectral efficiency.

BRIEF DESCRIPTION OF THE DRAWINGS

In the following, the invention will be described in greater detail with reference to the embodiments and the accompanying drawings, in which.

DETAILED DESCRIPTION

Figure 1:
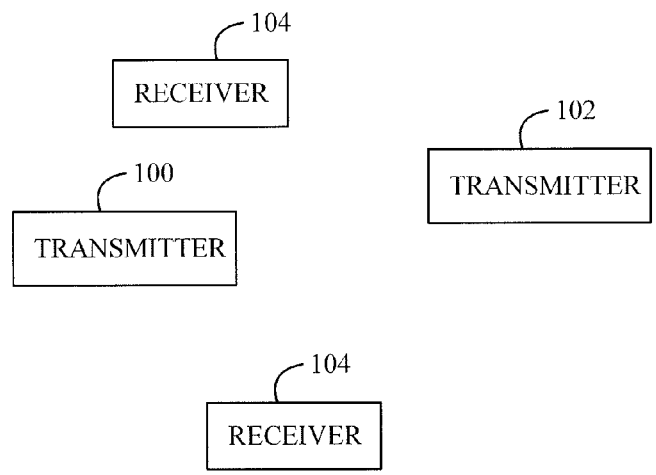
FIG. 1 shows a wireless network.

With reference to FIG. 1, examine first an example of a wireless communication network. A transmitter 100 may be a cognitive radio transmitter which may be about to start its transmission or is already transmitting. Another transmitter 102 may transmit in a channel suitable for the cognitive radio transmitter 100. The receivers 104 may be capable of receiving the transmission from the cognitive radio transmitter 100.

In a case where the cognitive radio transmitter 100 is about to start the transmission, it performs an LBT (Listen Before Transmission) operation during which the transmitter 100 searches for an unoccupied channel by measuring, for example, signal strengths in potential channels. A potential channel for a cognitive radio transmitter 100 may be at least one path through which information can be communicated. A channel may also be defined by, for example, a specified time, frequency or code division to transmit and receive electromagnetic signals. Possible transmission techniques may be, for example, TDM (Time Division Multiplexing), FDM (Frequency Division Multiplexing), (W) CDM ((Wide-band) Code Division Multiplexing), OFDM (Orthogonal Frequency Division Multiplexing), a combination of at least two of these, etc.

Since the other transmitter 102 may already be transmitting, the channel of the transmitter 102 is not available for the cognitive radio transmitter 100. In general, there may be a lot of other transmitters transmitting and occupying a large range of potential channels. After a free channel which is not used by any other transmitter inside the coverage has been found, the transmitter 100 may start its transmission and the receivers 104 may start listening the transmission.

Similarly, the transmitter 100 performs the LBT if the transmitter 100 is going to change its transmission channel due to, for example, interference.

However, the relation between a measured power level and an actual channel occupancy is not the same in all radio channels. Since some channels may have higher background noise than others, the power level alone in a channel may not be enough to decide whether a channel is occupied or not. Thus, the found channel(s) may finally prove unavailable. It is important that the transmitter not be allowed to interfere other transmitters.

The cognitive radio transmitter 100 may test the occupancy of each channel in two stages. First, the cognitive radio transmitter 100 may receive signals from channels and measure the received power level in each channel. Second, the cognitive radio transmitter 100 may perform detection operation of a channel in order to find out whether there is a detectable signal in the channel, i.e. whether some other transmitter is already transmitting in the channel or not. In detection operation the RF (Radio Frequency) signal is mixed to a base band signal, demultiplexed, demodulated and decoded in order to retrieve the transmitted bits.

Signal detection deals with a delectability of signals. Signals need to be separated from the background noise. In a classical approach based on a matched filter, detection tries to maximize the signal-to-noise ratio. The performance of this approach depends on the effectiveness of the system to eliminate the noise from the desired signal. The alternative approach, for example, is to define the problem of signal detection as the problem of feature extraction and pattern classification. Other signal detection methods are, for example Bayes principle, minimax rule, Neyman-Pearson rule and locally and universally most powerful tests.

If, for example, the sequence of bits is random, no signal is detected. If, for example, the sequence of bits includes information, a signal is detected.

The number of channels to be tested in the second stage may be limited by performing detection operation for only such a channel or channels whose received power is at an acceptable level.

The measurement of the power level of a channel may be carried out much faster than detection of a signal in a channel. Further, an advantage of performing the LBT in two stages is that detection of a signal in a channel may be performed only to a channel or channels which are most likely unoccupied on the basis of the power level measurements.

Since the LBT may still take quite a while to complete, the LBT operation may still be made faster while increasing its reliability. Background noise may mislead the decision of a channel's availability on the basis of the measurement of the power level in a channel. The problem may be solved by saving the measurement and/or detection information and using the historical records of each channel.

Figure 2:
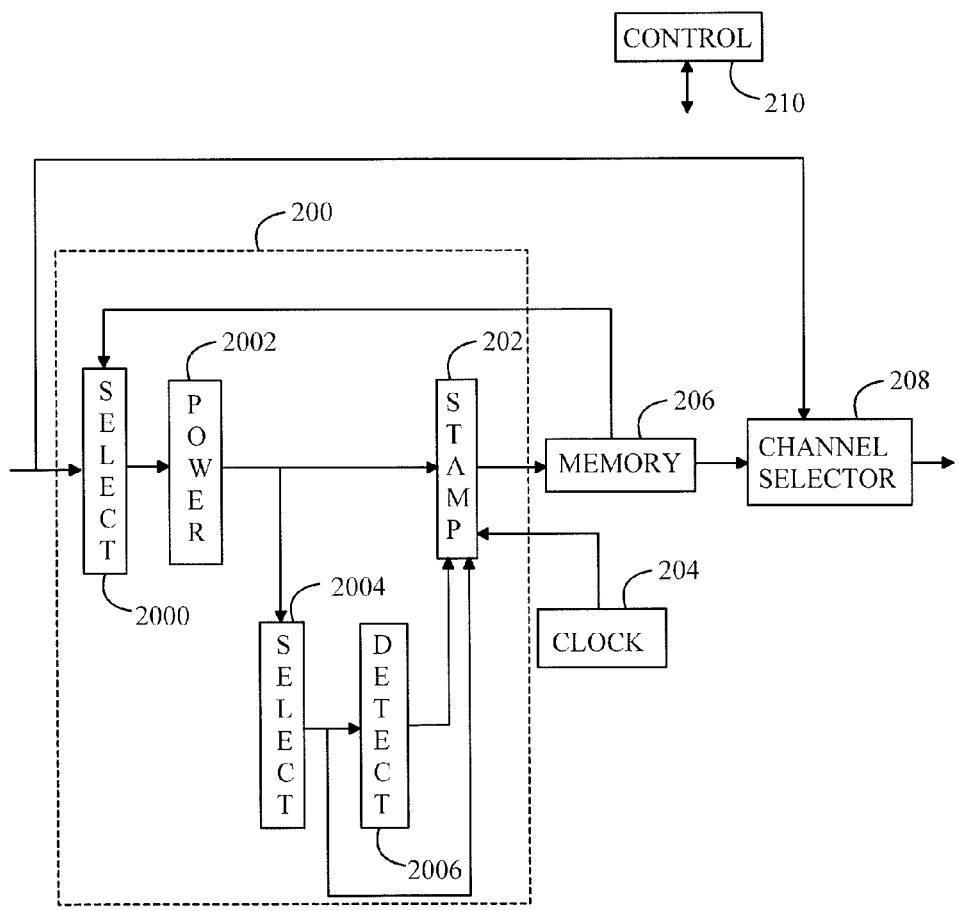
FIG. 2 illustrates a block diagram of a transmitter.

FIG. 2 illustrates a cognitive radio transmitter 100 saving information on the tested channels. During a normal operation, the cognitive radio transmitter 100 may perform each power level measurement and/or subsequent detection of a channel in a monitoring unit 200, time stamping information on the measurements and detections with a time signal being provided by a clock 204 in a marker 202, and save the information on the measurements and/or detections in a memory 206, such as a database. The time stamping defines the moment of time when each power level measurement and/or each detection of a channel was performed. The moments of time stamping may form a regular sequence such that the moment refers to the same time of the day. Alternatively or additionally, the moment of time may refer to a day of the week. In general, the measurements and detections may be performed at the moments of time which are cyclical in at least one manner and each cycle may define a predetermined period. A controller 210, which may include a processor, a memory and a suitable computer program, may control the transmitter 100. The selectors 2000, 2004 and 208 may be parts of the controller 210 or separate selectors controlled by the controller 210.

Assume now that the memory 206 is empty or information on a predetermined number of channels has not yet been saved in the memory 206. The predetermined number of channels refers to all or some channels potentially available for the transmitter. A new search may be performed such that the power selector 2000 does not make selection of channels since no channel information is available from the memory 206. Hence, a power meter 2002 measures powers in each channel according to a predetermined rule or randomly. Information on the power in each measured channel may be time stamped with time information from a clock 204 in the marker 202 and the information on power and timing may be saved in the memory 206. After the power measurement, detection may be performed for the channel. The detection selector 2004 may not perform selection when the memory 206 is empty or information on a predetermined number of channels has not yet been saved in the memory 206. Information on occupation (occupied or unoccupied) of each channel may be time stamped in the marker 202 and the information on occupation and timing may be saved in the memory 206.

Assume now that information on a plurality of channels has been saved in the memory 206. The power selector 2000 may select a channel which was determined free earlier at the same time when saving the information in the memory 206 for power measurement. The memory 206 may include the status "unoccupied" or "free" for a channel which had no detectable signal during detection. In the power meter 2002 the power of the selected channel may be measured. A marker 202 may time stamp the power information on the measured channel with a time signal from the clock 204. In the detection selector 2004, the power of the channel may be compared to the temporally corresponding power of the same channel whose information is saved in the memory 206.

If the power level of a measured channel is in a predetermined range from the power saved in the memory 206, the channel may be processed further. The predetermined range includes an allowed variation in the power saved in the memory 206. If the measured power level is outside the predetermined range, a new channel will be selected from the memory 206. The range may be a power range from a minimum power Pmin to a maximum power Pmax. The minimum power Pmin may be zero or have some non-zero value. When the minimum power Pmin is zero it means that there is no lower limit in the power comparison. The maximum power Pmax may be the power saved in the memory or a power higher than that saved in the memory 206. The maximum power Pmax may be, for example, 1 dB higher than the power saved in the memory in a case the channel was free when the power data was saved. The predetermined range may be adaptive. If there is no new channel available in the memory 206, a new search is performed.

In the further processing, detection is performed for the channel in a detector 2006 to check whether the channel is free or occupied. The information on the detected channel may then be time stamped in the marker 202. The information on the channel including the occupation and the timing may be saved in the memory 206. When a free channel is found, the channel selector 208 may select it for a transmission. Then the transmitter 100 may communicate using the channel selected by the channel selector 208.

The memory 206 may be updated constantly during the cognitive radio's normal operation. In an embodiment, the power meter 2002 of the transmitter 100 may perform measurements of the received power regularly and the transmitter 100 may save the information on the measurements of the channels in the memory 206. In a similar manner, the detector 2006 may detect whether channels are occupied or not during the cognitive radio's normal operation. The transmitter 100 may then save the information on detections of the channels in the memory 206. Detection selector 2004 may (or may not) be used to select only such channels for detection whose power level is in a predetermined range from an earlier measurement.

In an embodiment, the transmitter 100 may time stamp the saved information with the time of the day and select for communication only such a channel whose time stamping is in a predetermined range from the time of the day of the selection for detection. The range may be, for example, one minute. In general, the range may vary from, for example, seconds to hours.

In an embodiment, the transmitter 100 may time stamp the saved information with the time of the day and select for communication only such a channel whose time stamping is in a predetermined range from the time of the day of the selection for communication. The range may be, for example, one hour. In general, the range may vary from, for example, seconds to hours.

In an embodiment, the transmitter 100 may keep the saved information in the memory 206 only for a predetermined period. The predetermined period may be, for example, a week. In general, the predetermined period may vary from, for example, hours to years.

Figure 3:
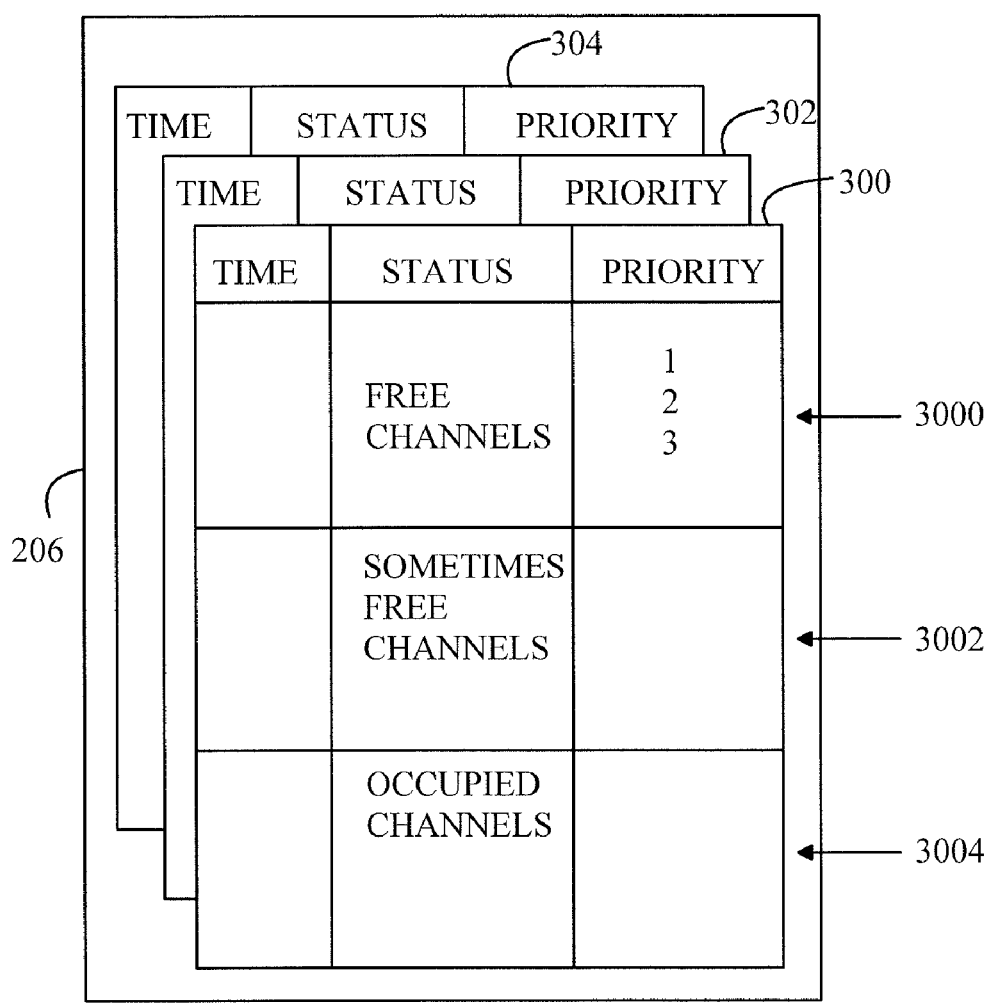
FIG. 3 illustrates tables in a memory.

FIG. 3 presents tables in the memory 206. The tables may be formed on the basis of the operations of power measurements, detections and time stamping. When the cognitive radio needs to find an unoccupied channel, it may refer to its own database to find unoccupied channels, for example, during the previous days at about the same time. In many cases, the occupancy of a radio channel follows the same temporal pattern, and therefore a channel that was occupied at the same time during previous days is most likely occupied also today. The historical record may be used to select the most promising channels for power level measurement and also for detection.

The channels may be divided into three categories according to their statuses, for instance. In general, the number of statuses and their names may vary. It may also be possible that there are no statuses at all. The channels may be processed also by the probability of being free. Each channel which is always free may have a probability 1. Each channel which is always occupied may have a probability 0. All other channels which are sometimes free and sometimes occupied may have a probability which is between 0 and 1. A channel which has a probability 1 may first be selected to be checked.

Instead, the channels may be arranged so that first there is a channel which has the lowest power level, and last there is the channel which has the highest power level. Then, the first channel is selected to be checked first by the power selector 2000, and if it can not selected by the channel selector 208, the second channel is selected next to be checked by the power selector 2000 etc.

A first table 300 may include a part 3000 having information on available channels, a part 3002 having information on channels sometimes available and a part 3004 having information on channels which are not available at about $t_0$, for example. A second table 302 may include similar information at $t_1$. A third table 304 may include similar information at $t_2$ and so on. The times $t_0$, $t_1$, $t_2$ and so on refer to the time of the day, for example.

In general, the day of the week may also be taken into account in the comparison. It may also be possible to take into account whether it is question of a working day, a day at the weekend, Sunday and/or a holiday.

If, for example, a time $t_0$ corresponds to the time when a channel is needed to continue or to start the transmission, a channel or channels may be selected from the parts 3000 and 3002 for the test including at least the measurement of a power level. A channel or channels may be selected from the part 3000 and only if part 3000 is empty a channel or channels may be selected from the part 3002. A present measurement result may be compared to earlier results in the memory 206. If the information in the memory 206 reveals that the same power level in the same channel resulted earlier in an occupied channel, the transmitter may skip the time consuming signal detection and select some other promising channel from the memory 206 for consideration. If, however, the information in the memory 206 reveals that the same power level in the same channel at the same time resulted earlier in a free channel, the signal detection can be performed to check that the channel is really unoccupied.

If the memory 206 has already been updated, a channel or channels may be selected from the table 3000 for communication.

Figure 4:
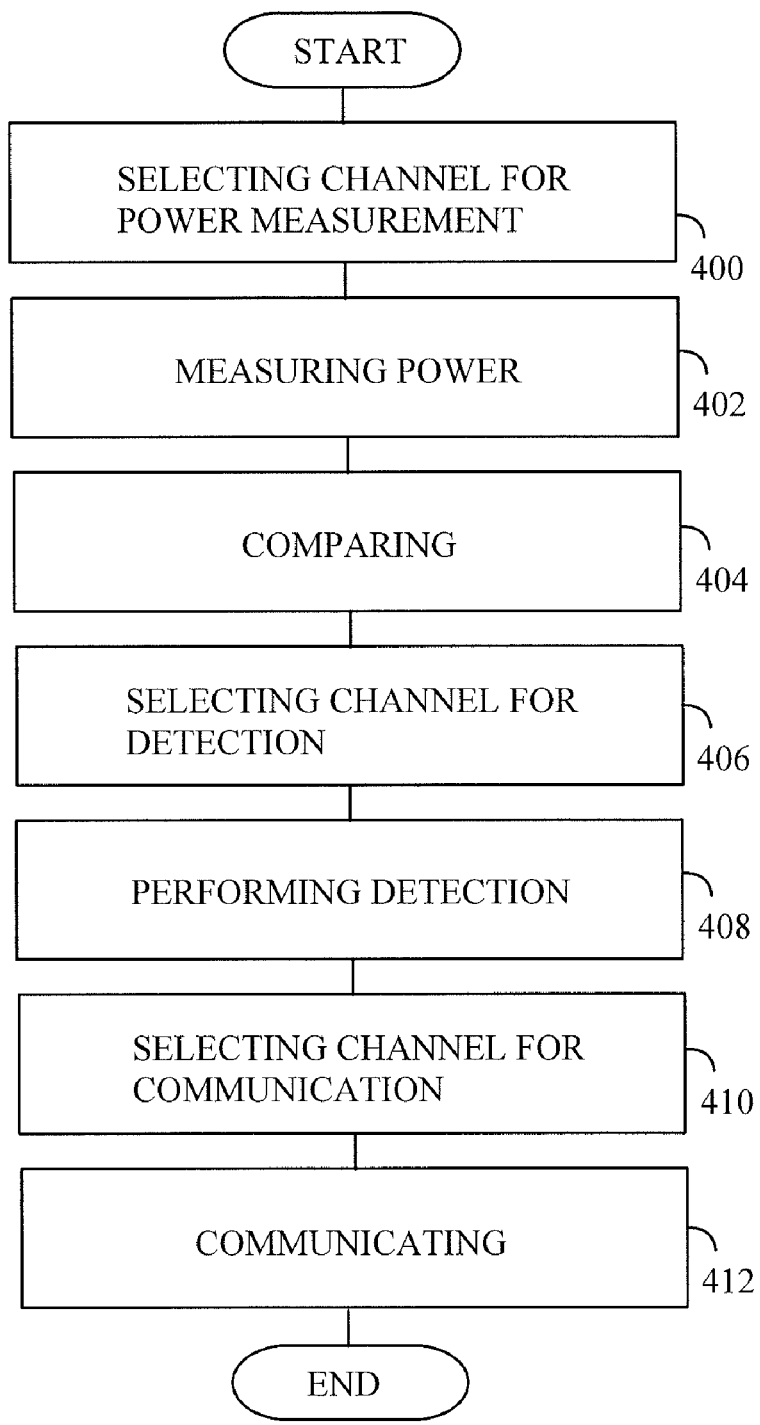
FIG. 4 illustrates a flow chart of a method.

FIG. 4 presents a flow chart of the method. In step 400, from a memory including information on a plurality of channels, a channel which was determined free is selected for power measurement. In step 402, the received power from the selected channel is measured. In step 404, the measured power and a power of the same channel saved in the memory is compared. In step 406, the channel is selected for detection if the power in the measured channel is within a predetermined range from the power saved in the memory. In step 408, detection of the channel is performed. In step 410, on the basis of detection, the channel for communication is selected if the channel is detected unoccupied. In step 412, communicating is performed in the channel.

The embodiments described in the method steps may be implemented as a computer program comprising instructions for executing a computer process for communication method of a cognitive radio.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

What is claimed is:

1. A method of communication of a cognitive radio, the method comprising:
    selecting, from a memory including information on a plurality of channels, a channel which is determined free, for power measurement;
    measuring the received power from the selected channel;
    comparing the measured power and a power of the same channel saved in the memory;
    selecting the channel for detection if the power in the channel is within a predetermined range from the power saved in the memory;
    performing detection of the channel as a response to the selection for detection;
    selecting the channel for communication if the channel is detected unoccupied on the basis of detection; and
    communicating in the channel as a response to the selection for communication.

2. The method of claim 1, the method further comprising saving information on each measured channel in the memory.

3. The method of claim 2, the method further comprising performing measurements of the received power regularly.

4. The method of claim 2, the method further comprising performing detections of channels regularly.

5. The method of claim 2, the method further comprising time stamping the saved information with the time of the day and selecting for communication only such a channel whose time stamping is in a predetermined range from the time of the day of the selection for communication.

6. The method of claim 2, the method further comprising keeping the saved information in the memory only for a predetermined period.

7. The method of claim 1, the method further comprising saving information on each detected channel in the memory.

8. A transmitter of a cognitive radio, the transmitter comprising;
    a power meter;
    a power selector;
    a detector;
    a detection selector;
    a memory; and
    a channel selector, power selector being configured to select from a memory including information on a plurality of channels, a channel which is determined free, for a power measurement, the power meter being configured to measure the received power from the selected channel, detection selector being configured to compare the measured power and a power of the same channel saved in the memory and to select the channel for detection if the power in the channel is within a predetermined range from the power saved in the memory, the detector being configured to perform detection, the channel selector being configured to select the channel for communication if the channel is detected unoccupied on the basis of detection, and the transmitter being configured to communicate in the channel as a response to the selection for communication.

9. The transmitter of claim 8, wherein the memory is configured to save information on each measured channel.

10. The transmitter of claim 9, the transmitter further comprising:
    a marker and
    a clock, the marker being configured to time stamp the saved information with the time of the day provided by the clock, wherein the power selector is configured to select for detection only such a channel whose time stamping is in a predetermined range from the time of the day of the selection for detection.

11. The transmitter of claim 9, wherein the power meter is configured to perform measurements of the received power regularly.

12. The transmitter of claim 8, wherein the memory is configured to save information on each detected channel.

13. The transmitter of claim 12, the transmitter further comprising;
    a marker and
    a clock, the marker being configured to time stamp the saved information with the time of the day provided by the clock, wherein detection selector is configured to select for communication only such a channel whose time stamping is in a predetermined range from the time of the day of the selection for communication.

14. The transmitter of claim 12, wherein the detector is configured to perform detections of channels regularly.

15. The transmitter of claim 8, wherein the memory is configured to store the saved information only for a predetermined period.

16. A non-transitory computer-readable storage medium comprising encoded instructions for a communication method of a cognitive radio that, when executed by a computing device, cause the computer device to:
    select from a memory including information on a plurality of channels, a channel which is determined free, for a power measurement;
    measure the received power from the selected channel;
    compare the measured power and a power of the same channel saved in the memory;
    select the channel for detection, if the power in the channel is within a predetermined range from the power saved in the memory;
    perform detection of the channel as a response to the selection for detection;
    select the channel for communication if the channel is detected unoccupied on the basis of detection; and
    perform communication in the channel as a response to the selection for communication.

17. The non-transitory computer-readable storage medium of claim 16, wherein the storage medium comprises at least one of the following media: a computer readable medium, a program storage medium, a record medium, a computer readable memory, a computer readable software distribution package, and a computer readable compressed software package.

* * * * *